April 28, 1931.  R. H. McHUGH  1,802,437
BAG HOLDER
Filed March 8, 1929  2 Sheets-Sheet 1
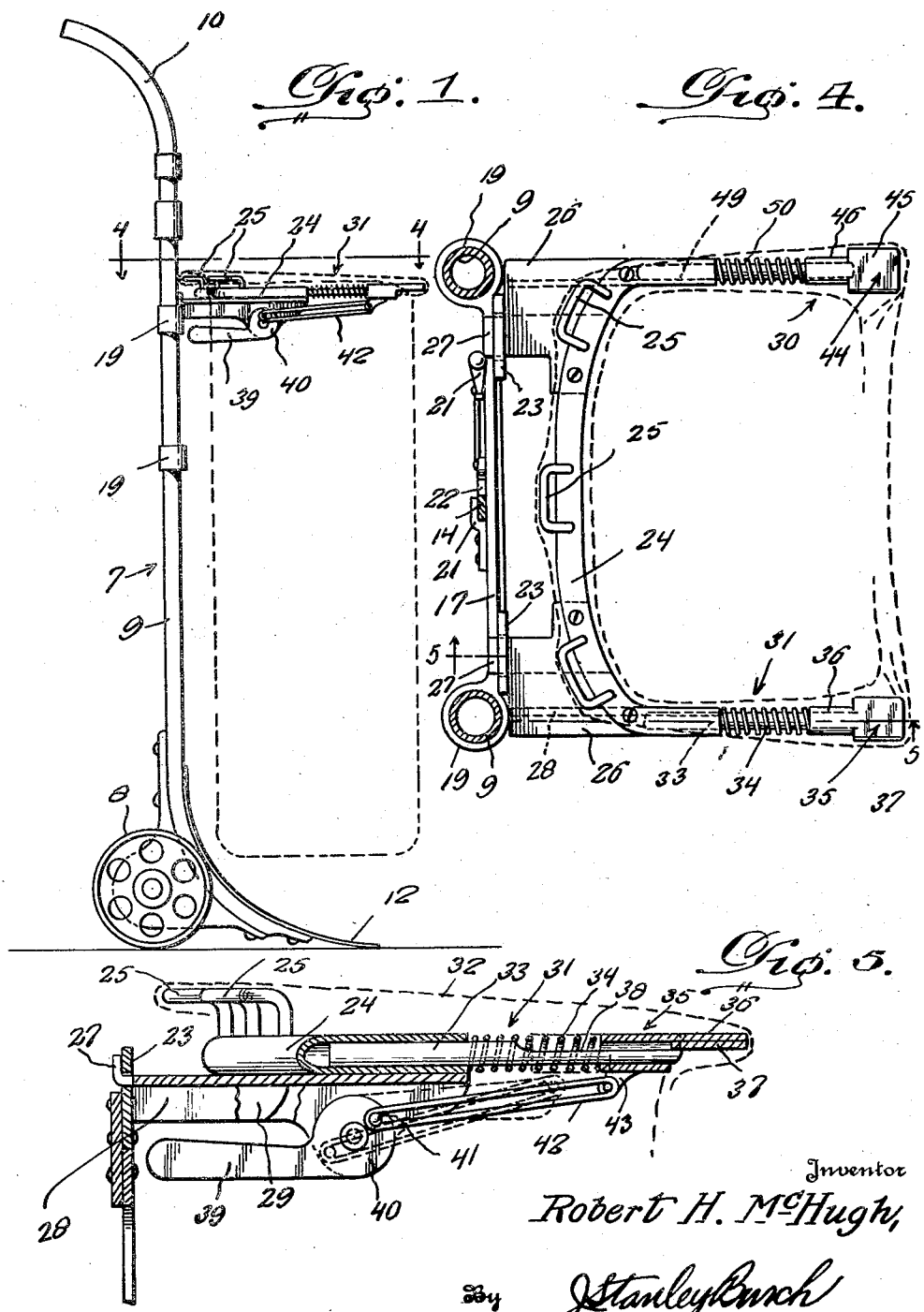
Inventor
Robert H. McHugh,
By J. Stanley Burch
Attorney April 28, 1931. R. H. McHUGH 1,802,437
BAG HOLDER
Filed March 8, 1929 2 Sheets-Sheet 2
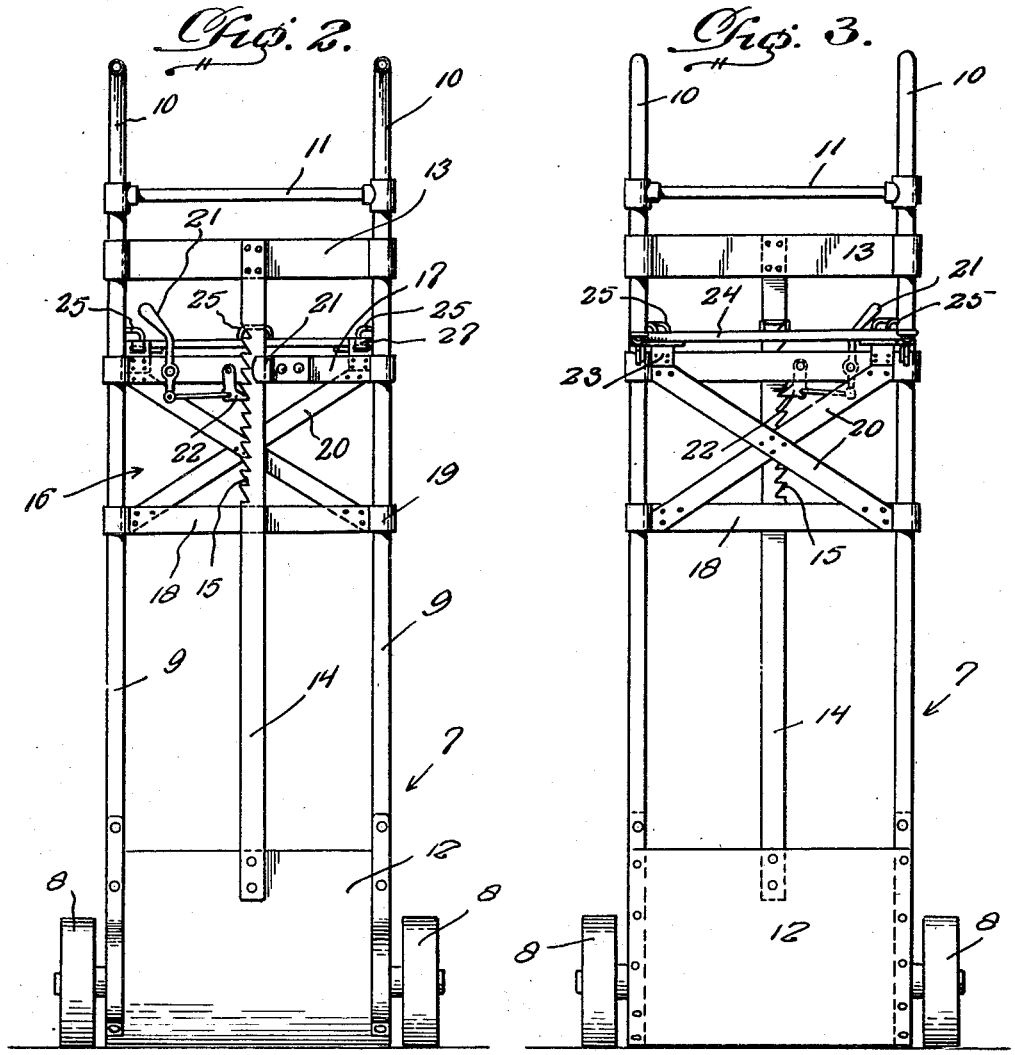
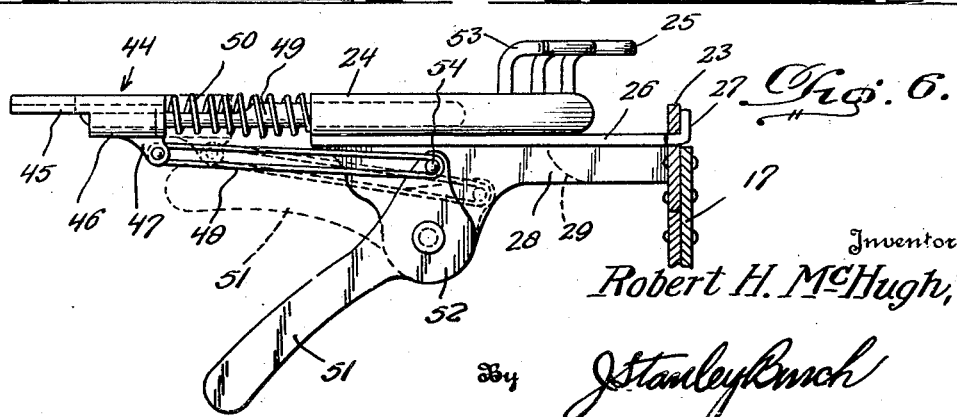
Inventor
Robert H. McHugh,
By J Stanley Burch
Attorney Patented Apr. 28, 1931

1,802,437

UNITED STATES PATENT OFFICE

ROBERT HENRY McHUGH, OF HORNBY, ONTARIO, CANADA

BAG HOLDER

Application filed March 8, 1929. Serial No. 345,342.

This invention relates to the broad class of bag holders and it has more particular reference to that species which embodies a wheeled portable truck or carrier, and an associated bag holding device mounted thereon.

The purpose of the invention is to provide a structure which will permit the bag to be conveniently transported from place to place and which will hold the mouth of the bag in open position to facilitate placement of articles therein, and which embodies an adjustable bag-holding device to facilitate placement of the bag as well as adjustment of the bag.

More specifically stated, I have evolved and produced a structure which is characterized by a combined portable truck and bag holder having improved bag-mounting means which may be moved longitudinally of the truck to support bags of various lengths, and which is adjustable laterally with respect to the side bars of the truck to support bags of different sizes.

One feature of the invention is the provision of a novel slidable frame which is longitudinally adjustable on the side bars of the truck, which constitutes an appropriate mounting for a special bag-clamping device, and which is associated with dependable retaining means for holding it in different adjusting positions to accommodate bags of different lengths.

An equally important feature of the invention is the bag-retaining or clamping unit, which is disposed at right angles to the slidable frame and which is separably connected therewith and provided with novel cooperating elements to enable a single person to place the mouth of the bag in position thereon, whereby to hold the mouth open for unhampered reception of the contents.

Other features and advantages of the invention will become more readily apparent from the following description and drawings.

In the drawings:

Figure 1 is a side elevational view of the compound structure showing the truck, the right angularly disposed bag clamp and the bag in dotted lines.

Figure 2 is a rear elevational view of the structure seen in Figure 1.

Figure 3 is a front elevational view of Figure 2.

Figure 4 is a horizontal sectional view taken approximately upon the plane of the line 4—4 of Figure 1.

Figure 5 is a detailed sectional and elevational view taken approximately upon the plane of the line 5—5 of Figure 4.

Figure 6 is a view similar to Figure 5 observing the opposite side of the bag-clamping means and showing the structure in elevation.

We will first analyze the structural details of the portable truck 7. This truck is provided with appropriate wheels 8 and with spaced parallel tubular side bars 9 terminating in appropriate curved handles 10. There is a reinforcing cross brace 11 adjacent the handle. Then at the bottom there is a foot plate 12 of the curved configuration shown in Figure 1, said plate serving to hold the truck in a vertical position as here represented. Extending transversely of the side bars 9 and rigidly connected thereto just below the brace 11 is a cross piece 13 with which a longitudinal bar 14 is connected. The lower end of this bar is fastened to the foot plate 12 and one edge of the bar is formed with ratchet teeth 15.

As before intimated, I provide a sliding frame and this is generally designated by the reference character 16 and it comprises upper and lower cross bars 17 and 18 respectively having eyes 19 slidable on the side bars 9. In addition I provide diagonal intersecting braces 20. Then too, there is a keeper 21 on the upper cross bar 17 and this keeper is slidably engageable with one edge of the rack bar 14. Moreover, the bar 17 carries a pivoted operating lever 21 for a retaining pawl 22 which cooperates with the teeth 15 and serves to hold the frame in different adjusted positions to accommodate bags of different lengths. At this time I invite attention to Figure 2 wherein it will be observed that the reference character 23 designates a small plate which is riveted to the cross bar 17 and which is provided with a slot. There are two of these plates 23 as seen in Figure 2 and they operate as abutments for stop plates for cooperation with the bag-clamping unit or device. In this connection it will be evident that the bag-clamping device is detachably connected with these plates and is therefore adjustable in unison with the sliding frame.

The bag-clamping device, generally considered, is of substantially U-shaped form as seen in Figure 4. The bight or connecting portion 24 is in the form of a U-tube and this is provided with longitudinally spaced bag hooks 25. In addition attaching plates 26 are rigidly connected with this tube and the plates are formed with retaining hooks 27 as shown in Figures 5 and 6 for engagement with the abutment plates 23. In addition these plates are provided with down-turned reinforcing flanges 28 and formed on their under sides with block-like abutment pieces 29 which bear against the abutment plates 23 to hold the complete device in substantially horizontal position and at right angles to the sliding frame. Associated with the laterally directed end portions of the tube 24 are individual spring pressed bag-engaging devices 30 and 31 respectively (see Fig. 4), these being adapted to be engaged with the forward corner portions of the bag 32. Although these devices are substantially the same in general construction, they are differentiated by the reference characters 30 and 31 because of the fact that they are successively operable in order to permit a single person to place the bag in position. For instance, the device 30 is of a quick releasable type while the device 31 is of a retarded releasable type. In fact the device 31 may be held in retracted position while the adjacent corner of the bag is slipped thereover while the device 30 may be momentarily retracted and then released for quick engagement with this particular corner of the bag. Because of this distinction in construction I invite attention to Figure 5 first. This shows the device 31. As seen here the reference character 33 designates a rod fitting telescopically but rigidly into the adjacent end of the tube 24. The outer end of this rod has its upper half cut away as at 34 to provide a reduced extension and the bag-engaging device 35 is slidably mounted on this. The bag-engaging device is formed from a short length of pipe including a tubular portion 36 slidable on the part 34 of the rod and a flattened bag-engaging head 37 engageable with the flat surface of the extension 34 to prevent turning of this part 35 on the rod 33. In addition there is a coil expansion spring 38 for forcing the device 35 normally outward to engage the corner of the bag. In addition, manually manipulated means is provided for moving this device 35 inwardly against the tension of the spring. The means comprises a small lever 39 having a pivotally mounted disk-like portion 40 carrying an eccentric pin 41. A link 42 has one end connected with this pin and the opposite end connected with a lug 43 on the device 35. This lever 39 may be pulled down and swung around in a direction from left to right in Figure 5 whereby to cause the eccentric pin 41 to exert a longitudinal pull on the link 42 and to move the link from the full line position to the dotted line position. The eccentric pin, passing beyond dead center, serves to hold the lever 39 in this position and to maintain the device 35 retracted against the tension of its complemental spring 34. This is the retarded action before mentioned. In other words, it is desirable in order to permit a single person to use this device to be able to hold the part 35 in retracted position for a time to facilitate placement of the bag.

The complemental device 44 on the opposite side is similar in construction but slightly different in action. Referring to Figure 6 it will be seen that it comprises a flat head 45 and a tubular portion 46 equipped with a lug 47 with which a link 48 is connected. In addition there is a rod 49 fitting telescopically into the adjacent end of the tube 24, and an expansion spring 50. In this instance the lever includes a pivotally mounted disk-like portion 52 having a peripheral extension 53 provided with a pin 54 with which the opposite end of the link is engageable. This lever is movable upwardly toward the bag-engaging device; that is, it is movable to the dotted line position here shown. Thus by placing the hand beneath the lever and lifting upwardly on it, a pull is exerted upon the link 48 to move the link to the dotted line position here shown. This momentarily retracts the device 44, but as soon as the lever is released, the spring 50 comes into play for returning the device 44 and quickly engaging the adjacent portion of the mouth of the bag.

Particularly, do I wish to emphasize the construction of the bag holder comprising the attaching plate separably connected with the abutment plates on the sliding frame, and the construction wherein stationary hooks 25 are provided on the tube 24, and successively operable spring-pressed devices 30 and 31 are provided, and so operable as to permit a single person to readily slip the corners of the mouth of the bag over the respective parts 35 and 44 in the manner described.

It is believed that by carefully considering the description in conjunction with the drawings, a clear understanding of the construction, operation and advantages of the invention will be had. Therefore, a more lengthy description is regarded unnecessary.

Minor changes in shape, size, materials and rearrangement of details coming within the field of the invention claimed may be resorted to in actual practice if desired.

What is claimed is:

1. In a structure of the class described, in combination, a truck embodying side bars, transporting wheels, a supporting and foot plate, a cross bar connected to said side bars adjacent the upper ends of the side bars, a longitudinally extending retainer bar secured to said cross bar and to said foot plate, said retainer bar being provided with rack teeth, a frame slidably mounted on said side bars and provided with a pawl for engaging said rack teeth, and a bag clamp carried by said frame.

2. In a structure of the class described, in combination, a truck embodying side bars, transporting wheels, a supporting and foot plate, a cross bar connected to said side bars adjacent the upper ends of the side bars, a longitudinally extending retainer bar secured to said cross bar and to said foot plate, said retainer bar being provided with rack teeth, a frame slidably mounted on said side bars and provided with a pawl for engaging said rack teeth, and a bag clamp carried by said frame, said frame comprising upper and lower cross-pieces having eyes at their outer ends slidably mounted on said side bars, together with diagonal brace elements disposed in intersecting relation and connected with said upper and lower cross pieces.

3. In a structure of the class described, in combination, a wheeled truck embodying spaced parallel side bars, a sliding frame mounted for longitudinal adjustment on said side bars, a rack bar carried by said truck, and a pawl carried by said frame and cooperable with said rack bar for holding said frame in different adjusted positions, a pair of slotted abutment plates carried by said frame, and a bag clamping unit including attaching plates having hooks engageable with the slot in said abutment plates, and blocks also engageable with said abutment plates.

4. In a structure of the class described, a bag supporting and clamping unit of general U-shaped form comprising a relatively stationary bight portion having rigid bag-engaging elements, and a pair of individually adjustable spring-pressed devices for engagement with complemental portions of said bag, a pivotally mounted operating lever for one of said spring-pressed devices, and an operating connection between said lever and the complemental device for retaining said device temporarily in retracted state when said lever is swung to a position beyond dead center.

5. In a structure of the class described, a bag supporting and clamping unit of general U-shaped form comprising a relatively stationary bight portion having rigid bag-engaging elements, and a pair of individually adjustable spring-pressed devices for engagement with complemental portions of said bag, a pivotally mounted operating lever for one of said spring-pressed devices, and an operating connection between said lever and the complemental device for retaining said device temporarily in retracted state when said lever is swung to a position beyond dead center, together with a separate pivotally mounted operating lever for the remaining spring-pressed device, and an operating connection between said device and said lever, whereby when the latter lever is moved in a direction toward said device, it will momentarily retract the device.

6. In a structure of the class described, a bag-clamping unit comprising a substantially U-shaped hollow tube, attaching plates fastened to said tube at longitudinally spaced points and provided with retaining hooks, bag-engaging hooks rigidly mounted at longitudinally spaced points on said tube, rods fitted telescopically to the opposite end portions of said tube, individual bag-engaging devices slidably and non-rotatably mounted on said rods, expansion springs surrounding the rods and interposed between the ends of said tube and said slidable bag-engaging devices, individual pivotally mounted operating levers, and link operating connections between the levers and bag-engaging devices.

In testimony whereof I affix my signature.

ROBERT HENRY McHUGH.